(12) United States Patent
Tang et al.

(10) Patent No.: US 8,634,212 B2
(45) Date of Patent: Jan. 21, 2014

(54) CONTROLLER AND CONTROLLING METHOD FOR POWER CONVERTER

(75) Inventors: Chien-Fu Tang, Hsinchu (TW); Isaac Y. Chen, Hsinchu County (TW); Jiun-Hung Pan, Hsinchu County (TW)

(73) Assignee: Richtek Technology Corp, Hsinchu (TW)

( * ) Notice: Subject to any disclaimer, the term of this patent is extended or adjusted under 35 U.S.C. 154(b) by 196 days.

(21) Appl. No.: 13/040,601

(22) Filed: Mar. 4, 2011

(65) Prior Publication Data

US 2012/0155122 A1 Jun. 21, 2012

(30) Foreign Application Priority Data

Dec. 20, 2010 (TW) .............................. 99144838 A

(51) Int. Cl.
*H02M 3/335* (2006.01)
(52) U.S. Cl.
USPC ...................................................... 363/21.15
(58) Field of Classification Search
USPC ........................................... 363/21.12–21.15
See application file for complete search history.

(56) References Cited

U.S. PATENT DOCUMENTS

| | | | | |
|---|---|---|---|---|
| 4,816,982 A * | 3/1989 | Severinsky | ..................... | 363/44 |
| 7,016,204 B2 * | 3/2006 | Yang et al. | .................. | 363/21.15 |
| 7,746,050 B2 * | 6/2010 | Djenguerian et al. | ..... | 363/21.12 |
| 2008/0291700 A1 | 11/2008 | Huang et al. | | |

FOREIGN PATENT DOCUMENTS

| | | |
|---|---|---|
| CN | 1746806 | 3/2006 |
| CN | 1783680 | 6/2006 |
| CN | 1848643 | 10/2006 |
| CN | 101243602 A | 8/2008 |
| CN | 201352769 | 11/2009 |
| CN | 101714818 | 5/2010 |
| CN | 201608645 | 10/2010 |
| TW | I251976 | 3/2006 |
| TW | I251979 | 3/2006 |
| TW | 200849779 | 12/2008 |

\* cited by examiner

*Primary Examiner* — Jue Zhang
(74) *Attorney, Agent, or Firm* — WPAT, PC; Justin King

(57) ABSTRACT

A controller for a power converter is provided. The controller includes a sense current integrating circuit, a reference current integrating circuit and a drive signal generation circuit. The sense current integrating circuit performs an integrating operation to a sense current representative of a conduction current flowing through a power switch of the power converter and thereby outputs a first integrating result. The reference current integrating circuit performs another integrating operation to a reference current and thereby outputs a second integrating result. The drive signal generation circuit determines a switching period of the power switch according to a status of an output voltage of the power converter cooperative with a relative magnitude relationship between the first integrating result and the second integrating circuit. Furthermore, a controlling method for such power converter also is provided.

5 Claims, 4 Drawing Sheets

CONTROLLER AND CONTROLLING METHOD FOR POWER CONVERTER

FIELD OF THE INVENTION

The present invention relates to power converters, and more particularly to a controller and a controlling method for a power converter.

BACKGROUND OF THE INVENTION

Many electrical devices such as cell phones, personal digital assistants (PDAs), laptops, etc. are powered by a source of relatively low-voltage DC power. Because power is generally delivered through a wall outlet as high-voltage AC power, a device, typically referred to as a power converter, is required to transform the high-voltage AC power to a low-voltage DC power, so as to provide output voltages and currents that meet the requirements of the electrical devices.

In operation, a power converter may use a controller to regulate output power delivered to the electrical device (i.e., load), and the power is regulated generally by controlling the ON and OFF states of a power switch in the power converter through the controller. In the power converter application, every external component has its maximum allowable current, voltage and power rating, and therefore the output power limit is required for protecting all components in safe operation region.

SUMMARY OF THE INVENTION

Therefore, the present invention is directed to a controller for a power converter, for providing an effective mechanism for output power limit.

The present invention is further directed to a controlling method for a power converter, which can provide an effective mechanism for output power limit.

In one aspect, a controller for a power converter in accordance with an embodiment of the present invention includes a sense current integrating circuit, a reference current integrating circuit and a drive signal generation circuit. The sense current integrating circuit is for performing an integrating operation to a sense current representative of a conduction current flowing through a power switch of the power converter to thereby obtain a first integrating result. The reference current integrating circuit is for performing an integrating operation to a reference current to thereby obtain a second integrating result. The drive signal generation circuit is for using a relative magnitude relationship between the first integrating result and the second integrating result cooperative with a status of an output voltage of the power converter to determine a switching period of the power converter.

In one embodiment, the drive signal generation circuit includes a first comparator, a second comparator and an AND gate. The first comparator compares the first integrating result with the second integrating result to thereby output a first comparison result representative of the relative magnitude relationship between the first integrating result and the second integrating result. The second comparator compares an output voltage error signal with a reference voltage to thereby output a second comparison result representative of the status of the output voltage. The AND gate performs a logical AND operation to the first comparison result and the second comparison result to produce a trigger signal for determining a moment of switching on the power switch and a moment of resetting the sense current integrating circuit and the reference current integrating circuit and thereby determining the switching period of the power switch.

Moreover, the drive signal generation circuit can further include a third comparator. The third comparator compares a sense voltage signal proportional to the conduction current with a preset peak voltage to thereby produce a third comparison result for determining a moment of switching off the power switch.

In addition, the drive signal generation circuit can still further include a flip-flop and a one-shot pulse generation circuit. The flip-flop produces a drive signal according to the trigger signal and the third comparison result to switch ON and OFF states of the power switch. The one-shot pulse generation circuit produces a one-shot pulse according to the drive signal to reset the sense current integrating circuit and the reference current integrating circuit.

In one embodiment, the flip-flop is an S-R type flip-flop. The trigger signal is inputted to a set terminal of the S-R type flip-flop, and the third comparison result is inputted to a reset terminal of the S-R type flip-flop.

In one embodiment, the sense current integrating circuit includes an amplifier, a current mirror circuit, an integrating capacitor and a switch element. The amplifier receives a sense voltage signal proportional to the conduction current and then provides the sense current through the current mirror circuit to charge the integrating capacitor. A terminal of the integrating capacitor receives the sense current and another terminal of the integrating capacitor is electrically coupled to a preset voltage. The switch element is electrically coupled between a connection node between the current mirror circuit and the integrating capacitor and the preset voltage. The switch element is switched on to enable the integrating capacitor to discharge to the preset voltage during the sense current integrating circuit is reset.

In one embodiment, the reference current integrating circuit includes a current source, an integrating capacitor and a switch element. The current source provides the reference current to charge the integrating capacitor. A terminal of the integrating capacitor receives the reference current and another terminal of the integrating capacitor is electrically coupled to a preset voltage. The switch element is electrically coupled between a connection node between the current source and the integrating capacitor and the preset voltage. The switch element is switched on to enable the integrating capacitor to discharge to the preset voltage during the reference current integrating circuit is reset.

In one embodiment, the current source is a constant current source. In an alternative embodiment, the current source is a variable current source, and a product of the reference current multiplied by an input voltage of the power converter is a fixed value.

In another aspect, a controlling method for a power converter in accordance with an embodiment of the present invention includes the following steps of: setting a reference current; sensing a conduction current flowing through a power switch of the power converter and integrating the sensed conduction current by time to thereby obtain an integrating result; and using a relative magnitude relationship between the integrating result and a product of the reference current multiplied by the integrating time cooperative with a status of an output voltage of the power converter to determine a switching period of the power switch.

In one embodiment, the step of using a relative magnitude relationship between the integrating result and a product of the reference current multiplied by the integrating time cooperative with a status of an output voltage of the power converter to determine a switching period of the power switch includes sub-steps of: judging an output voltage error signal representative of the status of the output voltage whether is larger than a reference voltage; judging the product of the reference current multiplied by the integrating time whether is larger than or equal to the integrating result; and using a moment of the output voltage error signal larger than the reference voltage and the product of the reference current multiplied by the integrating time larger than or equal to the integrating result as a trigger point of the switching period.

In one embodiment, the controlling method further includes a step of: using a relative magnitude relationship between a sense voltage signal proportional to the conduction current and a preset voltage to determine a length of conduction time in the switching period.

In one embodiment, the step of setting a reference current includes: sensing a direct current input voltage of the power converter; and calculating the reference current according to a preset input power of the power converter and the sensed direct current input voltage. In an alternative embodiment, the step of setting a reference current includes: setting the reference current as a fixed value.

In summary, in the various embodiments of the present invention, since the output power is well controlled by limiting input constant current/power in pulse frequency modulation (PFM) topology that is a simple control topology, and the present invention also can well control constant input current/power in wide input voltage range. Accordingly, the purpose of effectively controlling the output power can be achieved.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
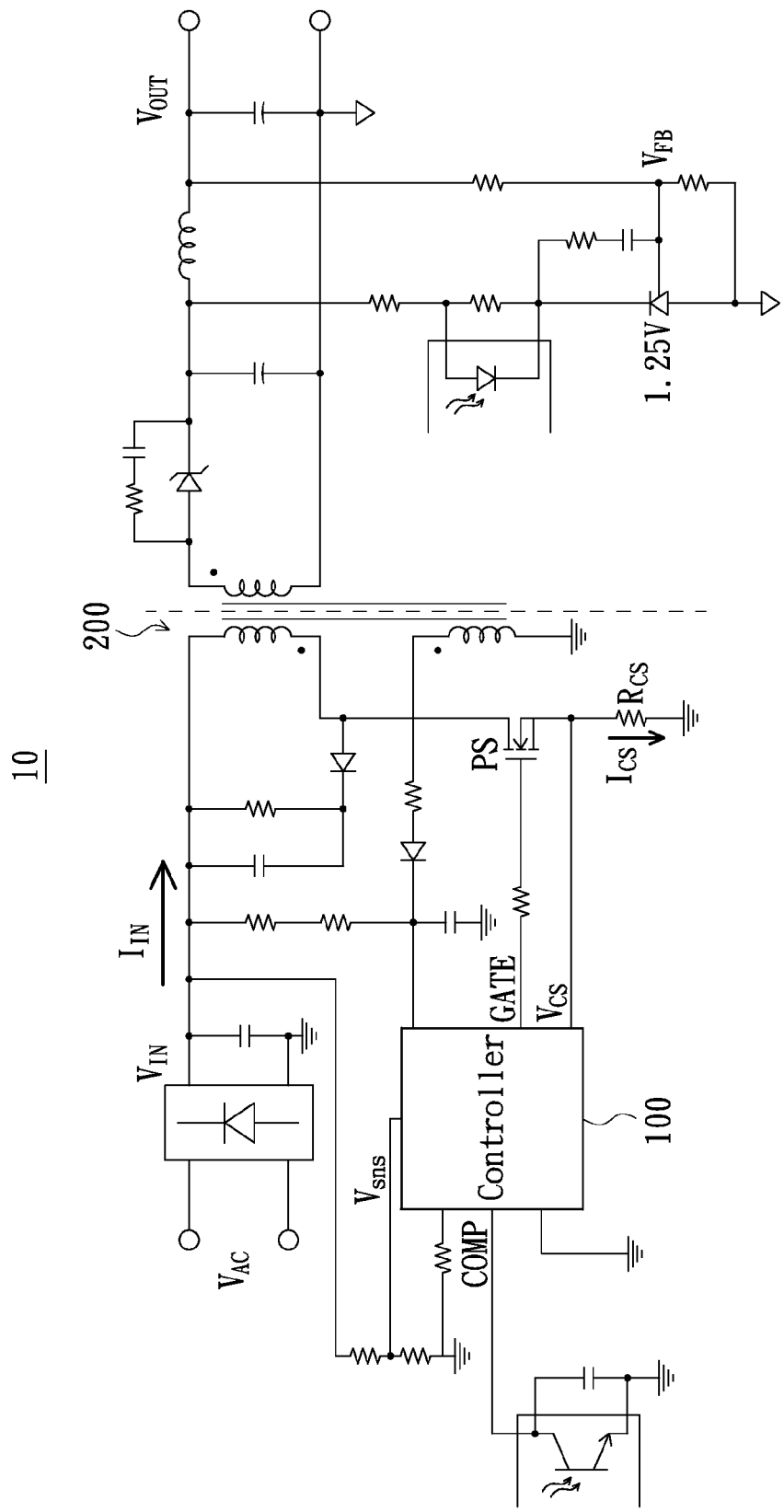
FIG. 1 is a schematic circuit structure view of a power converter to which a controller in accordance with an embodiment of the preset invention is applied.

Referring to FIG. 1, a schematic circuit structure of a power converter to which a controller in accordance with an embodiment of the present invention is applied. As illustrated in FIG. 1, the power converter 10 receives an alternating current (AC) voltage $V_{AC}$ and transforms the received alternating current voltage $V_{AC}$ into a direct current (DC) input voltage $V_{IN}$ by rectifying and filtering, and then uses an energy transfer element 200 e.g., a transformer to transform the direct current input voltage $V_{IN}$ into a direct current output voltage $V_{OUT}$ for supplying power to a load. In particular, the input side of the energy transfer element 200 primarily is equipped with a power switch PS and a controller 100. The power converter 10 provides a voltage signal Vsns to the controller 100 by resistor division to thereby allow the controller 100 to sense the input voltage $V_{IN}$. The controller 100 acquires a sense voltage signal $V_{CS}$ across a sense resistor $R_{CS}$ (herein, $V_{CS}=I_{CS}*R_{CS}$) to obtain a conduction current $I_{CS}$ flowing through the power switch PS and representative of an input current $I_{IN}$, to thereby sense the input current $I_{IN}$. The controller 100 outputs a drive signal GATE to control ON and OFF states of the power switch PS to thereby modulate the output power of the power converter 10. In another aspect, the output side of the energy transfer element 200 provides an output voltage $V_{OUT}$ to a load (not shown). A relative magnitude relationship between a feedback value $V_{FB}$ of the output voltage $V_{OUT}$ and a reference voltage of 1.25V is used to determine whether to light on the light emitting diode (not labeled). An output voltage error signal COMP is provided by photoelectric coupling to the controller 100 for sensing the status of the output voltage $V_{OUT}$.

Figure 2:
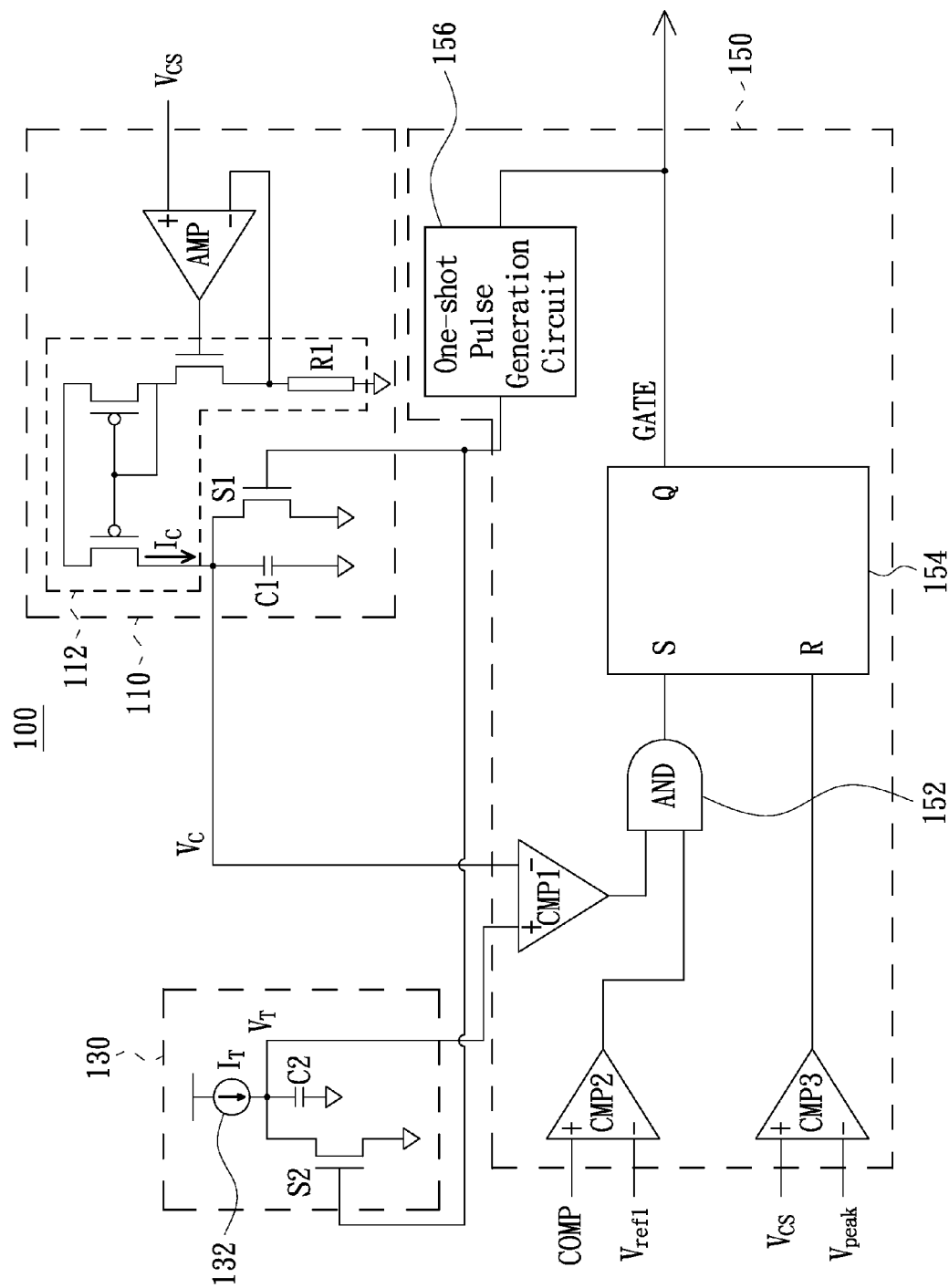
FIG. 2 is a schematic internal structure of the controller in FIG. 1.

Referring to FIG. 2, a schematic internal structure view of the controller 100 in FIG. 1 is shown. As illustrated in FIG. 2, the controller 100 includes a sense current integrating circuit 110, a reference current integrating circuit 130 and a drive signal generation circuit 150.

More specifically, the sense current integrating circuit 110 performs an integrating operation to a sense current $I_C$ representative of the conduction current $I_{CS}$ flowing through the power switch PS to thereby obtain an integrating result $V_C$. In the illustrated embodiment, the sense current integrating circuit 110 includes an amplifier AMP, a current mirror circuit 112, an integrating capacitor C1 and a switch element S1. The amplifier AMP receives the sense voltage signal $V_{CS}$ and then provides the sense current $I_C$ through the current mirror circuit 112 to the integrating capacitor C1 for charge. The resistor R1 herein is set to equal to $(1000*R_{CS})$, and therefore the sense current $I_C$ is approximately equal to $(I_{CS}/1000)$. A terminal of the integrating capacitor C1 is electrically coupled to receive the sense current $I_C$, and another terminal of the integrating capacitor C1 is electrically coupled to a preset voltage e.g., a grounding level. The switch element S1 is for example a transistor and electrically coupled between a connection node between the current mirror circuit 112 and the integrating capacitor C1 and the preset voltage. When the switch element S1 is switched on, the integrating capacitor C1 will be quickly discharged to the preset voltage to thereby reset the sense current integrating circuit 110.

The reference current integrating circuit 130 performs an integrating operation to a current signal $I_T$ to thereby obtain an integrating result $V_T$. In the illustrated embodiment, the reference current integrating circuit 130 includes a current source 132, an integrating capacitor C2 and a switch element S2. The current source 132 provides the current signal $I_T$ to the integrating capacitor C2 for charge. A terminal of the integrating capacitor C2 is electrically coupled to receive the current signal $I_T$, and another terminal of the integrating capacitor C2 is electrically coupled to the preset voltage e.g., the grounding level. The switch element S2 is for example a transistor and electrically coupled between a connection node between the current source 132 and the integrating capacitor C2 and the preset voltage. When the switch element S2 is switched on, the integrating capacitor C2 will be quickly discharged to the preset voltage to thereby reset the reference current integrating circuit 130. In the illustrated embodiment, since the sense current $I_C$ is set to be equal to $(I_{CS}/1000)$, and therefore the current signal $I_T$ is set to be equal to $(I_{target}/1000)$ correspondingly, where $I_{target}$ is a reference current. More specifically, in one aspect, when the power converter 10 is operated in a constant input power mode, an input power $P=(V_{IN}*I_{target})*T/T=(V_{IN}*\int_0^T I_{CS}dt/T)$ is constant, where T is a switching period of the power switch PS. Therefore $\int_0^T I_{CS}dt=I_{target}*T$ and $I_{target}=P/V_{IN}$, so that in the constant input power mode, the reference current $I_{target}$ can be calculated out after sensing the input voltage $V_{IN}$, such situation is corresponding to the current source 132 being a variable current source. In another aspect, when the power converter 10 is operated in a constant input current mode, the input power $P=(V_{IN}*I_{target})*T/T=(V_{IN}*\int_0^T I_{CS}dt/T)$ is not constant and varied along the change of the input voltage $V_{IN}$. Therefore $\int_0^T I_{CS}dt=I_{target}*T$, while the reference current $I_{target}$ can be directly set as a fixed value, such situation is corresponding to the current source 132 being a constant current source.

The drive signal generation circuit 150 uses a relative magnitude relationship between the integrating results $V_C$ and $V_T$ cooperative with the status of the output voltage $V_{OUT}$ to determine the switching period T of the power switch PS. In the illustrated embodiment, the drive signal generation circuit 150 includes comparators CMP1, CMP2, CMP3, an AND gate 152, an S-R type flip-flop 154 and a one-shot pulse generation circuit 156. The comparator CMP1 receives the integrating results $V_C$, $V_T$ and then outputs a first comparison result according to a relative magnitude relationship between the integrating results $V_C$ and $V_T$. The comparator CMP2 receives the output voltage error signal COMP and a reference voltage Vref1, and then outputs a second comparison result according to a relative magnitude relationship between the output voltage error signal COMP and the reference voltage Vref1. The first comparison result and the second comparison result then are inputted to the AND gate 152 to be performed with a logical AND operation to thereby produce a trigger signal to a set terminal S of the S-R type flip-flop 154. The comparator CMP3 receives the sense voltage signal $V_{CS}$ and a preset peak voltage $V_{peak}$ and then outputs a third comparison result to a reset terminal R of the S-R type flip-flop 154 according to a relative magnitude relationship between the sense voltage signal $V_{CS}$ and the preset peak voltage $Vp_{eak}$. Herein, the preset peak voltage $V_{peak}=I_{peak}*R_{CS}$, where $I_{peak}$ is a peak current. Afterwards, the S-R type flip-flop 154 outputs the drive signal GATE on an output terminal Q thereof according to the trigger signal and the third comparison result, to thereby switch the ON and OFF states of the power switch PS. Herein, the trigger signal is used to determine a moment of switching on the power switch PS, and the third comparison result is used to determine a moment of switching off the power switch PS, i.e., determine a conduction time length of the power switch PS in a single switching period T. The one-shot pulse generation circuit 156 produces a one-shot pulse triggered by a rising edge of the drive signal GATE to switch on the switch elements S1, S2, to thereby determine a moment of resetting the sense current integrating circuit 110 and the reference current integrating circuit 130.

Figure 3:
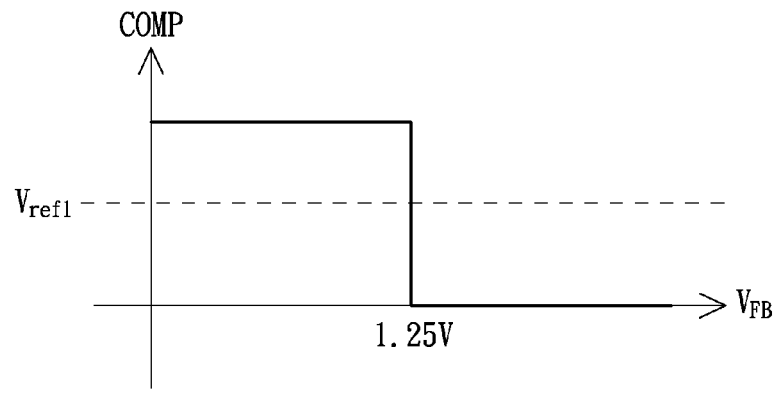
FIG. 3 shows a relationship between a feedback value of an output voltage and an output voltage error signal in FIG. 1.
Figure 4:
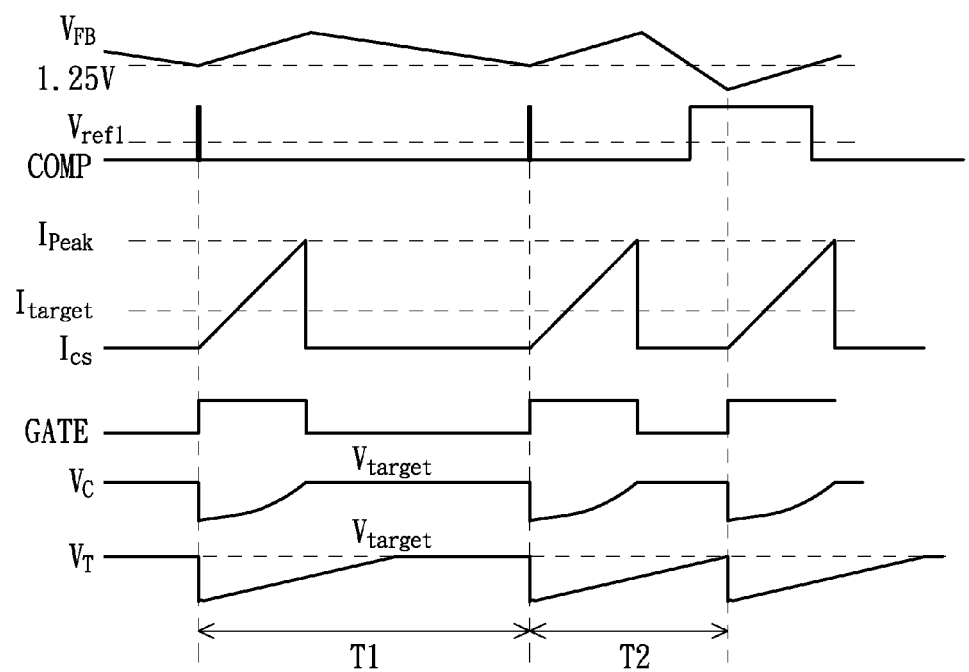
FIG. 4 is a timing diagram of multiple signals associated with the controller in FIG. 2.

Referring to FIGS. 3 and 4, FIG. 3 showing a relationship between the output voltage error signal COMP and the feedback value $V_{FB}$ of the output voltage $V_{OUT}$, and FIG. 4 showing a timing diagram of multiple signals associated with the controller 100. As seen from FIG. 3, when the feedback value $V_{FB}$ of the output voltage $V_{OUT}$ is smaller than the reference voltage of 1.25V, the output voltage error signal COMP is a high voltage level higher than the reference voltage $V_{ref1}$; whereas, when the feedback value $V_{FB}$ is larger than 1.25V, the output voltage error signal COMP is a low voltage level lower than the reference voltage $V_{ref1}$.

Referring to FIGS. 2 and 4 together, (1) in the situation of normal loading, for example in a first switching period T1 (i.e., one value of the switching period T) as illustrated in FIG. 4, at the start point of the conduction time (corresponding to the drive signal GATE being a logic high level) of the switching period T1, the drive signal GATE produced from the S-R type flip-flop 154 jumps to a logic high level, the sense current integrating circuit 110 and the reference current integrating circuit 130 are quickly reset and then start to perform respective integrating operations. The power switch PS is switched on so that the conduction current $I_{CS}$ starts to increase. When the conduction current $I_{CS}$ increases to the peak current $I_{peak}$, the sense voltage signal $V_{CS}$ is increased to the preset peak voltage $V_{peak}$ correspondingly, so that the third comparison result outputted from the comparator CMP3 becomes a logic high level, the S-R type flip-flop 154 is reset to enable the drive signal GATE outputted on the output terminal Q thereof to jump to a logic low level, and the power switch PS is switched off and enters into a switched-off time of the switching period T1. Subsequently, the integrating result $V_C$ is equal to a target integrating voltage $V_{target}$, while the integrating result $V_T$ continue to increase until being equal to the target integrating voltage $V_{target}$, so that the first comparison result outputted from the comparator CMP1 is kept on a logic high level for a while. Afterwards, when the output voltage error signal COMP is larger than the reference voltage Vref1, the second comparison result outputted from the comparator CMP2 becomes a logic high level, so that the trigger signal outputted from the AND gate 154 is a logic high level and thereby the drive signal GATE outputted on the output terminal Q of the S-R type flip-flop 156 jumps to the logic high level again, which represents the end of the current switching period T1 and the start of the next switching period.

(2) In the situation of overloading, for example in a second switching period T2 (i.e., another value of the switching period T) as illustrated in FIG. 4, at the start point of the conduction time of the switching period T2, the drive signal GATE produced from the S-R type flip-flop 154 jumps to the logic high level, the sense current integrating circuit 110 and the reference current integrating circuit 130 are quickly discharged and then start to perform the respective integrating operations. The power switch PS is switched on so that the conduction current $I_{CS}$ starts to increase. When the conduction current $I_{CS}$ increases to the peak current $I_{peak}$, the sense voltage signal $V_{CS}$ is increased to the preset peak voltage $V_{peak}$ correspondingly, so that the third comparison result outputted from the comparator CMP3 becomes the logic high level, the S-R type flip-flop 154 is reset and the drive signal GATE outputted on the output terminal Q of the S-R type flip-flop 154 jumps to the logic low level. At this moment, the power switch PS is switched off and enters into the switched-off time of the switching period T2, the integrating result $V_C$ of the sense current integrating circuit 110 is equal to the target integrating voltage $V_{target}$. Subsequently, since the feedback value $V_{FB}$ of the output voltage $Y_{OUT}$ is lower than 1.25V for a while, the second comparison result outputted from the comparator CMP2 is kept on the logic high level for a while. Subsequently, when the integrating result $V_T$ produced from the reference current integrating circuit 130 is equal to the target integrating voltage $V_{target}$, the first comparison result outputted from the comparator CMP1 becomes the logic high level, the trigger signal outputted from the AND gate 154 jumps to the logic high level, so that the drive signal GATE outputted on the output terminal Q of the S-R flip-flop 154 jumps to the logic high level again, which represents the end of the current switching period T2 and the start of the next switching period.

It also can be found from FIG. 4 that the switching periods T1, T2 in the respective situations of normal loading and overloading are different from each other (i.e., corresponding to a pulse frequency modulation topology), and the conduction times (corresponding to the drive signal GATE being the logic high level) in the respective switching periods T1, T2 are constant.

Figure 5:
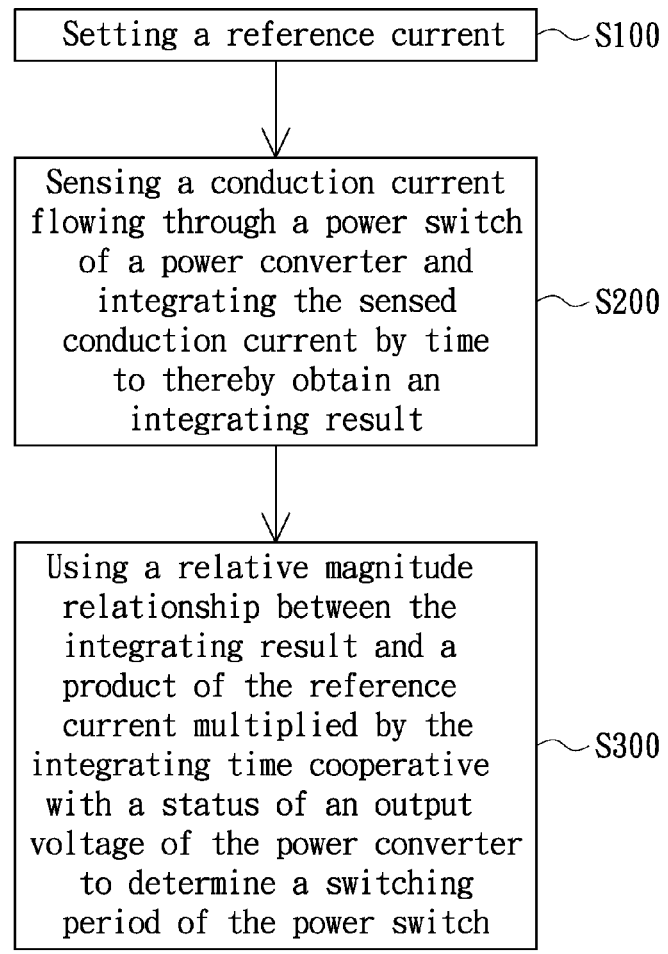
FIG. 5 is a schematic flowchart of a controlling method for a power converter in accordance with an embodiment of the present invention.

Referring to FIG. 5, a schematic flowchart of a controlling method for a power converter in accordance with an embodiment of the present invention is shown. As illustrated in FIG. 5, the controlling method in the present embodiment includes the following steps S100-S300.

In the step S100, a reference current is set. In one aspect, when the power converter operates in a constant input power mode, the reference current can be calculated out after sensing a direct current input voltage of the power converter. In another aspect, when the power converter operates in a constant input current mode, the reference current is set to be a fixed value.

In the step S200, a conduction current flowing through a power switch of the power converter is sensed and the sensed conduction current is integrated by time to thereby obtain an integrating result of $\int_0^T I_{CS} dt$.

In the step S300, a relative magnitude relationship between the integrating result and a product of the reference current multiplied by the integrating time cooperative with a status of an output voltage of the power converter are used to determine a switching period of a power switch of the power converter. For example, the moment of the product ($I_{target}$*T) of the reference current multiplied by the integrating time larger than or equal to the integrating result of $\int_0^T I_{CS} dt$ and an output voltage error signal COMP representative of the status of the output voltage larger than a reference voltage $V_{ref1}$ is used as the trigger point of a switching period T of the power switch, and the time interval between two such trigger points is the time length of a single switching period T.

Sum up, in the various embodiments of the present invention, since the output power is well controlled by limiting input constant current/power in pulse frequency modulation (PFM) topology that is a simple control topology, and the present invention also can well control constant input current/power in wide input voltage range for example 96V-340V, even wider. Accordingly, the purpose of effectively controlling the output power (since energy conversion efficiency=output power/input power<1) is achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A controller for a power converter, comprising:
a sense current integrating circuit, for integrating a sense current representative of a conduction current flowing through a power switch of the power converter to directly obtain a first integrating result;
a reference current integrating circuit, for performing an integrating operation to a reference current to thereby obtain a second integrating result; and
a drive signal generation circuit, for using a relative magnitude relationship between the first integrating result and the second integrating result cooperative with a status of an output voltage of the power converter to determine a switching period of the power switch;
wherein the drive signal generation circuit comprises:
a first comparator, for comparing the first integrating result with the second integrating result to thereby output a first comparison result representative of the relative magnitude relationship between the first integrating result and the second integrating result;
a second comparator, for comparing an output voltage error signal with a reference voltage to thereby output a second comparison result representative of the status of the output voltage;
an AND gate, for performing a logic AND operation to the first comparison result and the second comparison result to generate a trigger signal for determining a moment of switching on the power switch and a moment of resetting the sense current integrating circuit and the reference current integrating circuit and thereby determining the switching period of the power switch;
a third comparator, for comparing a sense voltage signal proportional to the conduction current and a preset peak voltage to thereby output a third comparison result for determining a moment of switching off the power switch;
a flip-flop, for generating a drive signal according to the trigger signal and the third comparison result to switch ON and OFF states of the power switch; and
a one-shot pulse generation circuit, for generating a one-shot pulse according to the drive signal to reset the sense current integrating circuit and the reference current integrating circuit;
wherein the flip-flop is an S-R type flip-flop, a set terminal of the S-R type flip-flop is electrically coupled to receive the trigger signal, and a reset terminal of the S-R type flip-flop is electrically coupled to receive the third comparison result.

2. The controller according to claim 1, wherein the sense current integrating circuit comprises an amplifier, a current mirror circuit, an integrating capacitor and a switch element, the amplifier is electrically coupled to receive a sense voltage signal proportional to the conduction current and provides the sense current through the current mirror circuit to the integrating capacitor for charge, a terminal of the integrating capacitor is electrically coupled to receive the sense current and another terminal of the integrating capacitor is electrically coupled to a preset voltage, the switch element is electrically coupled between a connection node between the current mirror circuit and the integrating capacitor and the preset voltage, and the switch element is switched on to discharge the integrating capacitor to the preset voltage during the sense current integrating circuit is reset.

3. The controller according to claim 1, wherein the reference current integrating circuit comprises a current source, an integrating capacitor and a switch element, the current source is to provide the reference current to the integrating capacitor for charge, a terminal of the integrating capacitor is electrically coupled to receive the reference current and another terminal of the integrating capacitor is electrically coupled to a preset voltage, the switch element is electrically coupled between a connection node between the current source and the integrating capacitor and the preset voltage, and the switch element is switched on to discharge the integrating capacitor to the preset voltage during the reference current integrating circuit is reset.

4. The controller according to claim 3, wherein the current source is a constant current source.

5. The controller according to claim 3, wherein the current source is a variable current source, and a product of the reference current multiplied by an input voltage of the power converter is constant.

* * * * *